(12) United States Patent
Stahl, Sr. et al.

(10) Patent No.: US 8,397,452 B2
(45) Date of Patent: Mar. 19, 2013

(54) FIRESTOPPING BUSHING

(75) Inventors: James P. Stahl, Sr., Stockton, NJ (US); James P. Stahl, Jr., Princeton Junction, NJ (US); Julio Lopes, Dunellen, NJ (US); Paul Gandolfo, Doylestown, PA (US)

(73) Assignee: Specified Technologies Inc., Someville, NJ (US)

( * ) Notice: Subject to any disclaimer, the term of this patent is extended or adjusted under 35 U.S.C. 154(b) by 298 days.

(21) Appl. No.: 12/806,614

(22) Filed: Aug. 17, 2010

(65) Prior Publication Data

US 2011/0088342 A1   Apr. 21, 2011

Related U.S. Application Data

(60) Provisional application No. 61/279,050, filed on Oct. 15, 2009.

(51) Int. Cl.
*E04C 2/00* (2006.01)

(52) U.S. Cl. ........ 52/232; 52/317; 52/220.1; 52/396.01; 52/394; 137/79; 285/187

(58) Field of Classification Search .............. 52/1, 2.19, 52/317, 232, 220.1, 220.8, 220.5, 701, 704, 52/396.01, 394; 174/480, 483; 439/650, 439/651; 137/76, 77, 79, 360, 67, 68.11; 285/220, 194, 187, 189, 58, 190; 277/935, 277/929, 931; 251/315.03, 315.04, 315.05
See application file for complete search history.

(56) References Cited

U.S. PATENT DOCUMENTS

| | | | |
|---|---|---|---|
| 2,542,583 A | 2/1951 | Shea, Jr. | |
| 2,985,091 A | 5/1961 | Hatcher | |
| 3,125,358 A | 3/1964 | Kleinberg et al. | |
| 4,018,983 A | 4/1977 | Pedlow | |
| 4,086,736 A | 5/1978 | Landrigan | |
| 4,225,649 A | 9/1980 | Peterson | |
| 4,276,332 A | 6/1981 | Castle | |
| 4,302,917 A | 12/1981 | Fermvik et al. | |
| 4,363,199 A | 12/1982 | Kucheria et al. | |
| 4,467,577 A | 8/1984 | Licht | |
| 4,513,173 A | 4/1985 | Merry | |
| 4,548,853 A | 10/1985 | Bryan | |
| 4,559,745 A | 12/1985 | Wexler | |
| 4,623,170 A | 11/1986 | Cornwall | |
| 4,630,415 A | 12/1986 | Attwell | |
| 4,848,043 A * | 7/1989 | Harbeke ............... 52/1 |
| 4,850,385 A * | 7/1989 | Harbeke ........... 137/75 |
| 4,936,064 A | 6/1990 | Gibb | |
| 5,058,341 A * | 10/1991 | Harbeke, Jr. ............ 52/232 |
| 5,155,957 A * | 10/1992 | Robertson et al. ............ 52/232 |
| 5,174,077 A | 12/1992 | Murota | |
| 5,297,817 A * | 3/1994 | Hodges ............ 285/15 |
| 5,347,767 A | 9/1994 | Roth | |
| 5,351,448 A * | 10/1994 | Gohlke et al. ............ 52/1 |

(Continued)

*Primary Examiner* — Joshua J Michener
*Assistant Examiner* — Chi Q Nguyen
(74) *Attorney, Agent, or Firm* — Sperry, Zoda & Kane

(57) ABSTRACT

A relatively inexpensive bushing easily installed extending through walls, particularly, gypsum board membrane walls for providing firestopping around a limited number of linear penetrating members such as cables or wires. This grommet construction includes first and second half sections for facilitating attachment around cables more easily. A split internal seal preferably of resilient foam material is positioned within a split mechanical shell which facilitates placing of the bushing around penetrating members prior to placement thereof through walls or after positioned thereof penetrating through a panel such as wallboard. A split mechanical shell with a two-piece foam insert retained within a bore extending therethrough can be formed as two separable half cylindrical shells. Barbs are included on the outer portion of the shell to facilitate mounting thereof. The foam firestopping seal portion can be intumescent.

21 Claims, 12 Drawing Sheets

U.S. PATENT DOCUMENTS

| | | | |
|---|---|---|---|
| 5,390,465 A | 2/1995 | Rajecki | |
| 5,447,400 A | 9/1995 | Seymour | |
| 5,456,050 A * | 10/1995 | Ward | 52/220.8 |
| 5,560,174 A | 10/1996 | Goto | |
| 5,594,202 A | 1/1997 | Tobias | |
| 5,634,304 A | 6/1997 | Sakno | |
| 5,729,938 A | 3/1998 | Tobias | |
| 5,887,396 A * | 3/1999 | Thoreson | 52/232 |
| 5,947,159 A | 9/1999 | Takahashi | |
| 6,176,052 B1 * | 1/2001 | Takahashi | 52/232 |
| 6,417,464 B2 * | 7/2002 | Steele | 177/105 |
| 6,711,329 B2 | 3/2004 | Zelesnik | |
| 6,718,100 B2 | 4/2004 | Morris | |
| 6,876,797 B2 | 4/2005 | Morris | |
| 8,029,345 B2 * | 10/2011 | Messmer et al. | 454/284 |
| 2003/0009961 A1 * | 1/2003 | Radke et al. | 52/220.1 |
| 2004/0149390 A1 * | 8/2004 | Monden et al. | 156/391 |

* cited by examiner

FIRESTOPPING BUSHING

The present utility application hereby formally claims priority of currently pending U.S. Provisional Patent application No. 61/279,050 filed Oct. 15, 2009 on "FIRESTOPPING BUSHING" filed by the same inventors as listed herein, namely, James P Stahl Sr., James P. Stahl Jr., Julio Lopes and Paul Gandolfo, and assigned to the same assignee, namely, Specified Technologies, Inc. of Somerville N.J.; said referenced provisional application being hereby formally incorporated by reference as an integral part of the present application for all purposes.

BACKGROUND OF THE INVENTION

1. Field of the Invention

The present invention provides a unique construction for a relatively inexpensive bushing or grommet that can be installed into walls to provide sealing about individual cables or wires or around a number of small cables and/or wires or other linear penetrating members normally numbered no more than three. The bushing can also extend around to seal around a wire plug or cable plug. The bushing includes an internal foam seal which is designed to seal against the passage of smoke, flames or hot gases therethrough for achieving firestopping.

Heretofore such cables have been run through openings formed in the walls or floors and then sealed with the use of various mastic materials such as sealants or putties, some of which were for firestopping. Such openings are often sleeved in some circumstances with cables running through the sleeves and sealing materials are thereafter applied within and around the sleeve at the point where it penetrates through the wall or other barrier. These uses are limited in many ways because, for example, the sealants tend to adhere the cables with respect to one another and with respect to the opening through the wallboard which makes any changes needed to the cabling configuration at a later time quite difficult. Also, such mastic materials are usually applied by hand by skilled workers and this is a labor intensive activity requiring skill and the time required can be quite costly and the effective quality of the sealing is highly dependent on the skill of the technician. Also, these prior methods lack a finished overall appearance because the actual appearance of the final seal is very highly dependent upon the skill and diligence of the technician applying the mastic materials.

Many mechanical designs have also been designed such as rubber plugs or framing constructions designed to fit around one or more wires. Many of these constructions cannot be installed in typical gypsum board membrane walls because the wallboard lacks sufficient structural strength to restrain the expanding fixture especially when the fixture utilized is a rubber plug or similar design.

Usages of these above described designs are limited because many of them can only be placed upon the wire prior to placement through the wall because there is no capability for attaching the bushing or grommet to the wire after it has been positioned extending through aperture provided in the wall. Most such constructions are also designed for use with many different cables and larger cables and, thus, there is a readily apparent for use for a small inexpensive type grommet which can be easily be attached to cables, plugs or a plug used therewith after they have been placed extending through the wallboard as well as being capable of usage prior to positioning of the cable or cable plug extending through the wallboard.

2. Description of the Prior Art

Many prior art devices have been used for firestopping around cables extending through a wall and for sealing around said cables such as shown in U.S. Pat. No. 2,542,583 patented Feb. 20, 1951 to W. T. Shea, Jr. on a "Cable-Sealing Fitting"; and U.S. Pat. No. 2,985,091 patented May 23, 1961 to R. L. Hatcher and assigned to Noll Manufacturing Company on a "Cap Assembly"; and U.S. Pat. No. 3,125,358 patented Mar. 17, 1964 to J. S. Kleinberg et al on a "Building Lead-In Connection For A Pipe"; and U.S. Pat. No. 4,018,983 patented Apr. 19, 1977 to J. W. Pedlow on an "Electrical Arc And Fire Protective Sheath, Boot Or The Like"; and U.S. Pat. No. 4,086,736 patented May 2, 1978 to L. P. Landrigan and assigned to Daniel International Corporation on a "Fire And Liquid Seals For Pipes And Conduits And Method Of Forming Same"; and U.S. Pat. No. 4,225,649 patented Sep. 30, 1980 to R. L. Peterson and assigned to The Flamemaster Corporation on a "Fire Retardant Composition And Cables Coated Therewith"; and U.S. Pat. No. 4,276,332 patented Jun. 30, 1981 to G. K. Castle on a "Fire Proof Cable Tray Enclosure"; and U.S. Pat. No. 4,302,917 patented Dec. 1, 1981 to L. A. Fermvik et al and assigned to Telefonaktiebolaget I. M. Ericsson on a "Method And Means For Fire-Sealing A Penetration For A Conduit"; and U.S. Pat. No. 4,363,199 patented Dec. 14, 1982 to C. S. Kucheria et al and assigned to Kennecott Corporation on a "Fire Resistant Sealing System For Holes In Fire Resistant Buildings Partitions"; and U.S. Pat. No. 4,467,577 patented Aug. 28, 1984 to R. R. Licht and assigned to Minnesota and Manufacturing Company on an "Intumescent Fire Barrier Material Laminated With Restraining Layer"; and U.S. Pat. No. 4,513,173 patented Apr. 23, 1985 to R. P. Merry and assigned to Minnesota Mining and Manufacturing Company on "Intumescent Fire Protective Sheaths"; and U.S. Pat. No. 4,548,853 patented Oct. 22, 1985 to H. H. Bryan on a "Closure For A Surface Opening Having An Object Passing Therethrough And Method Of Forming The Closure"; and U.S. Pat. No. 4,559,745 patented Dec. 24, 1985 to J. B. Wexler and assigned to Fire Research Pty. Limited on "Devices For The Fire Stopping Of Plastics Pipes"; and U.S. Pat. No. 4,623,170 patented Nov. 18, 1986 to K. R. Cornwall on a "Coupling"; and U.S. Pat. No. 4,630,415 patented Dec. 23, 1986 to R. L. Attwell and assigned to Selkirk Division of Household Manufacturing Limited on a "Fire Stop"; and U.S. Pat. No. 4,936,064 patented Jun. 26, 1990 to J. F. Gibb and assigned to Backer Rod Manufacturing And Supply Company on a "Fireproof Panel"; and U.S. Pat. No. 5,174,077 patented Dec. 29, 1992 to G. Nurota and assigned to The Furukawa Electric Co., Ltd. on a "Fire Protecting Structure Of Channel Portion Of Plastic Piping In A Fire Partition"; and U.S. Pat. No. 5,347,767 patented Sep. 20, 1994 to R. Roth on a "Fire Retardant Sleeve"; and U.S. Pat. No. 5,390,465 patented Feb. 21, 1995 to J. A. Rajecki and assigned to The Lamson & Sessions Co. on a "Passthrough Device With Firestop"; and U.S. Pat. No. 5,447,400 patented to H. E. Seymour on Sep. 5, 1995 and assigned to Xantech Corporation on a "Wall Penetrator Fitting"; and U.S. Pat. No. 5,560,174 patented Oct. 1, 1996 to Y. Goto and assigned to Home Co., Ltd. on a "Connector"; and U.S. Pat. No. 5,594,202 patented Jan. 14, 1997 to M. A. Tobias on a "Split Sleeve System"; and U.S. Pat. No. 5,634,304 patented Jun. 3, 19997 to M. P. Sakno on a "Water Impervious Intumescent Firestop Collapsing Conduit"; and U.S. Pat. No. 5,729,938 patented to M. A. Tobias on Mar. 24, 1998 on a "Wall Penetrator Sleeve System"; and U.S. Pat. No. 5,947,159 patented Sep. 7, 1999 to J. Takahashi and assigned to Tosetz Co., Ltd. on a "Fire Retarding Division Penetrating Member"; and U.S. Pat. No. 6,711,329 patented Mar. 23, 2004 to Dd. J. Zelesnik and assigned to Parker-Hannifin Corporation on a "Flame Retardant Tubing Bundle"; and U.S. Pat. No. 6,718,100 patented Apr. 6, 2004 to D. D. Morris and assigned to Milliken & Company on a "Fire Resistant Conduit Insert For Optical Fiber Cable"; and U.S. Pat. No. 6,876, 797 patented Apr. 15, 2005 to D. D. Morris and assigned to Milliken & Company on a "Fire Resistant Conduit Insert For Optical Fiber Cable".

SUMMARY OF THE INVENTION

The present invention provides a firestopping bushing positional with an aperture defined in a wallboard panel for firestopping around one or more penetrating members such as a cable or wire or multiple cables or wires extending therethrough. The firestopping bushing is made of two half tubular sections. The bushing can also be used extending around cable or wire plugs to facilitate firestopping therearound when positioned in a wall.

The construction includes a first half section which is generally half tubularly shaped to define a first half bore extending longitudinally therealong. This first half section will include a first interior surface which is generally arcuate and concave to define the first half bore extending longitudinally therealong. The first half section further includes a first exterior surface being generally arcuate and convex positioned spatially disposed from the first interior surface and positioned facing radially outwardly therefrom.

Further included within the construction of the first half section is a first abutment edge extending longitudinally along the first interior surface and the first exterior surface and positioned extending therebetween. This first abutment edge will preferably include two separate sections. One section will be defined as the first abutment edge first section which extends longitudinally along the first interior surface and first exterior surface and is positioned extending therebetween. The first abutment edge further includes a first abutment edge second section extending longitudinally along the first interior surface and the first exterior surface and is positioned extending therebetween at a position spatially disposed from the first abutment edge first section with the first half bore positioned therebetween.

The first half section further includes a first head end defining a first head opening therewithin in fluid flow communication with the first half bore. A first insertion end is defined on the first half section which itself defines a first insertion opening therein in fluid flow communication with respect to the first half bore and with respect to the first head opening. The first half section will also include a first head flange section extending radially outwardly from the first exterior surface at the first head end thereof. The first half section will also include at least one or more first barbs extending outwardly from the first exterior surface to facilitate engagement thereof with respect to a wallboard panel responsive to positioning of the first half section within a wallboard aperture.

A first firestopping sealing section will be included of flexibly resilient firestopping material positionable within the first half bore of the first half section such that it includes a first sealing section arcuate surface positionable in abutment with respect to the first interior surface to facilitate retaining of the first firestopping sealing section within the first half bore. The first firestopping sealing section will also include a first sealing section planar surface oppositely positioned from the first sealing section arcuate surface and positioned in direct flexibly resilient abutment with respect to any penetrating members positioned extending through the firestopping bushing to facilitate firestopping sealing therearound.

The bushing of the present invention will further include a second half section which is generally half tubularly shaped to define a second half bore extending longitudinally therealong. The second half section and the first half section will be attachable in abutment with respect to one another to position the first half bore and the second half bore adjacently together and in full fluid flow communication with respect to one another to define a central bore extending axially and longitudinally through the firestop bushing.

The second half section further includes a second interior surface which is generally arcuate and concave to define the second half bore extending longitudinally therealong. Also included is a second exterior surface defined to be generally and convex positioned spatially disposed from the first interior surface and positioned facing radially outwardly therefrom.

The second half section further includes a second abutment edge extending longitudinally along the second interior surface and the second exterior surface and being positioned extending therebetween. This second abutment edge includes two sections. Initially it includes a second abutment edge first section extending longitudinally along the second interior surface and the second exterior surface and being positioned extending therebetween. The second abutment edge first section of the second half section is positionable in abutment and engagement with the first abutment edge second section of the first half section to facilitate abutting engagement therebetween. The second abutment edge further includes a second abutment edge second section extending longitudinally along the second interior surface and the second exterior surface and being positioned extending therebetween at a position spatially disposed from the second abutment edge first section with the second half bore positioned therebetween. The second abutment edge second section of the second half section is positionable in abutment and engagement with the first abutment edge first section of the first half section to facilitate abutting engagement therebetween.

The second half section will also include a second head end defining a second head opening therein in fluid flow communication with the second half bore. The second head opening and the first head opening are positioned adjacently to define together a main head opening responsive to abutting engagement between the first half section and the second half section. Also defined on the second half section is a second insertion end which defines a second insertion end opening therein in fluid flow communication with respect to the second half bore and with respect to the second head opening. The second insertion opening and the first insertion opening are positioned adjacently to define a main insertion opening responsive to abutting engagement between the first half section and the second half section.

The second half section further includes a second head flange section extending radially outwardly from the second exterior surface at the second head end. The second head flange section is positioned adjacent to the first head flange section to define a head flange responsive to abutting engagement between the first half section and the second half section. Further included is at least one or more second barbs extending outwardly from the second exterior surface to facilitate engagement thereof with respect to the wallboard panel responsive to positioning of the second half section within the wallboard panel aperture.

The bushing further includes a second firestopping sealing section of flexibly resilient firestopping material positionable within the second half bore of the second half section. This second firestopping sealing section includes a second sealing section arcuate surface positionable in abutment with respect to the second interior surface to facilitate retaining of the second firestopping sealing section within the second half bore. The second firestopping sealing section also includes a second sealing section planar surface oppositely positioned from the second sealing section arcuate surface and positionable in direct flexibly resilient abutment with the first sealing section planar surface to define a sealing seam therebetween for receiving penetrating members positioned extending therethrough to facilitate firestop sealing therearound.

The first firestopping sealing section and the second firestopping sealing section are both made of flexibly resilient foam material preferably and also are preferably intumescent.

One of the unique characteristics of the present invention is that the first half sections and the second half sections are all formed identically with respect to one another thereby eliminating the inventory problem of maintaining two separately configured pieces for the first half section and the second section. Thus, each half section can mutually engage with any other half section to form the bushing of the present invention.

The first half section can include a first engaging means positioned along the first abutment edge thereof and the second half section can include a second engaging means positioned along the second abutment edge thereof. This first engagement means and this second engagement means can be engageable with respect to one another to retain the first abutment edge of the first half section with respect to the second abutment edge of the second half section.

In the preferred configuration of the present invention a plurality of latching pins and latching slots will be defined in the first abutment edge and second abutment edge to facilitate respective engagement therebetween.

Preferably the firestopping bushing first half section and second half section are made of a thermoplastic material and the first and second firestopping sealing sections are both made of a foam intumescent flexibly resilient material.

It is an object of the firestopping bushing of the present invention to eliminate the extensive labor costs for the sealing around individual cables or small bundles of cables or cable plugs extending through walls.

It is an object of the firestopping bushing of the present invention to provide an inexpensive bushing or grommet that can be installed into walls for smoke sealing of individual cables or a small bundle of normally not more than three such cables.

It is an object of the firestopping bushing of the present invention to eliminate the use of sealants or putties that is applied by skilled personnel to seal around individual cables or small bundles of cables or around a cable plug extending through wallboards.

It is an object of the firestopping bushing of the present invention to provide a means for positioning thereof around a cable that is already extending through a wallboard surface or is about to be placed through an opening extending through a wallboard surface.

It is an object of the firestopping bushing of the present invention to provide a clean appearance where cables penetrating non-rated gypsum wallboards.

It is an object of the firestopping bushing of the present invention to include raised ribs or barbs on the external surface thereof to facilitate maintaining of engagement in position with respect to the wall construction.

It is an object of the firestopping bushing of the present invention to provide a split mechanical shell made of molded thermoplastic or thermosetting material which can facilitate overall firestopping.

It is an object of the firestopping bushing of the present invention to provide a split mechanical shell which can be made from two identical halves which can be attached with respect to one another about a cable prior to positioning thereof extending through a wallboard or sheetrock construction.

It is an object of the firestopping bushing of the present invention to include a tapered section on the shell to facilitate insertion thereof in position mounted within gypsum wallboard.

It is an object of the firestopping bushing of the present invention to severely limit the movement of smoke, flame or hot gases through a wall adjacent to a cable extending therethrough.

It is an object of the firestopping bushing of the present invention to facilitate firestopping around individual or a small number of relatively small cables utilizing a split foam seal which can include an intumescent component or will be fully functional without the inclusion of an intumescent component.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 12:
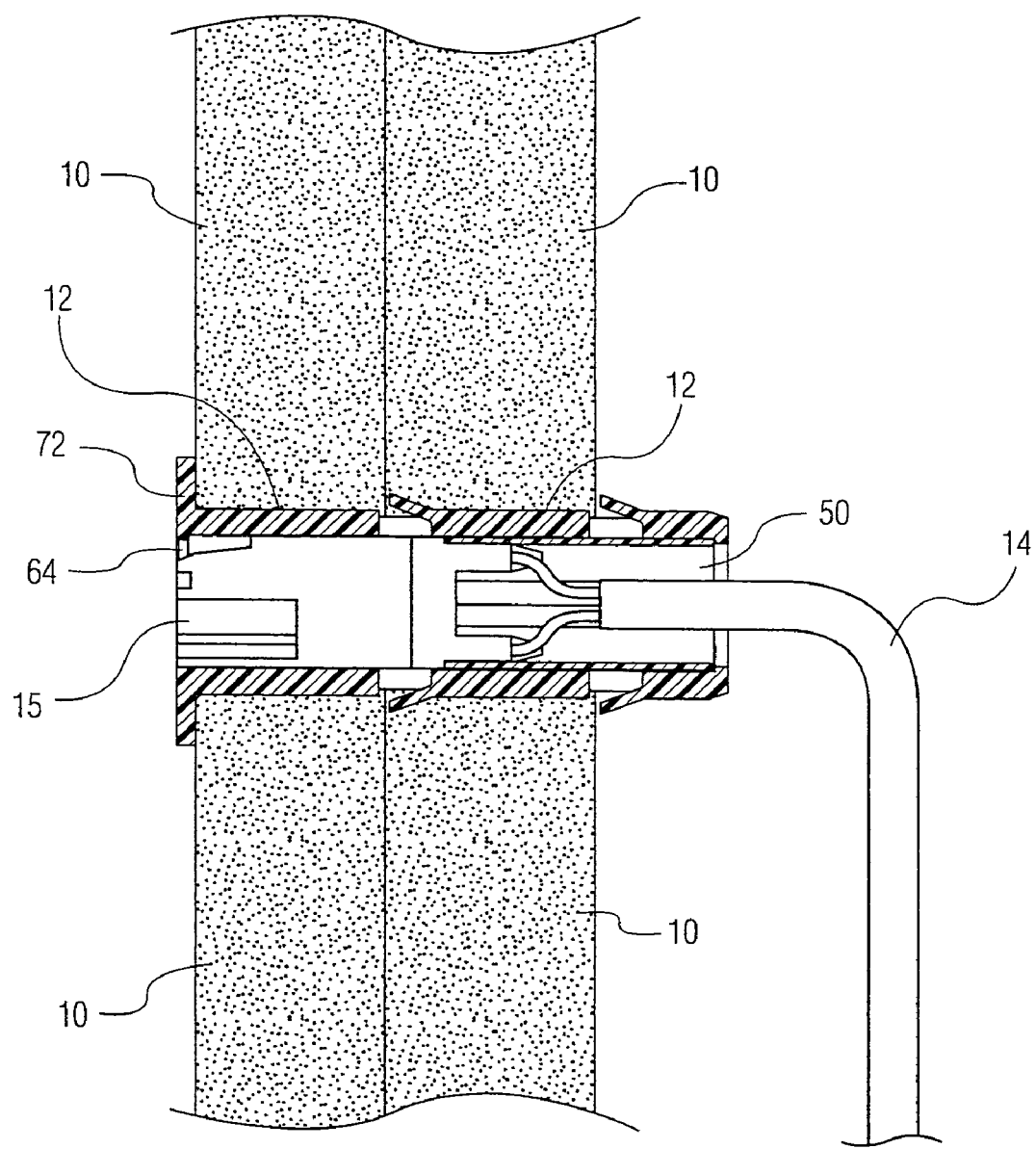
FIG. 12 is a side cross-sectional view of an embodiment of the present invention shown firestopping around a cable or wire plug.

The present invention provides a generally inexpensive and easy to use firestopping bushing for use in placement in a wallboard panel 10 by placement into an aperture 12 through which a penetrating member such as a cable or wire or multiple small cables or wires 14 can extend. The bushing can also be placed surrounding a wire or cable plug 15 as shown in FIG. 12. The bushing is configured in two half sections including a first half section 16 and a second half section 46. The two half sections 16 and 46 can be secured with respect to one another to form the final bushing configuration.

Figure 2:
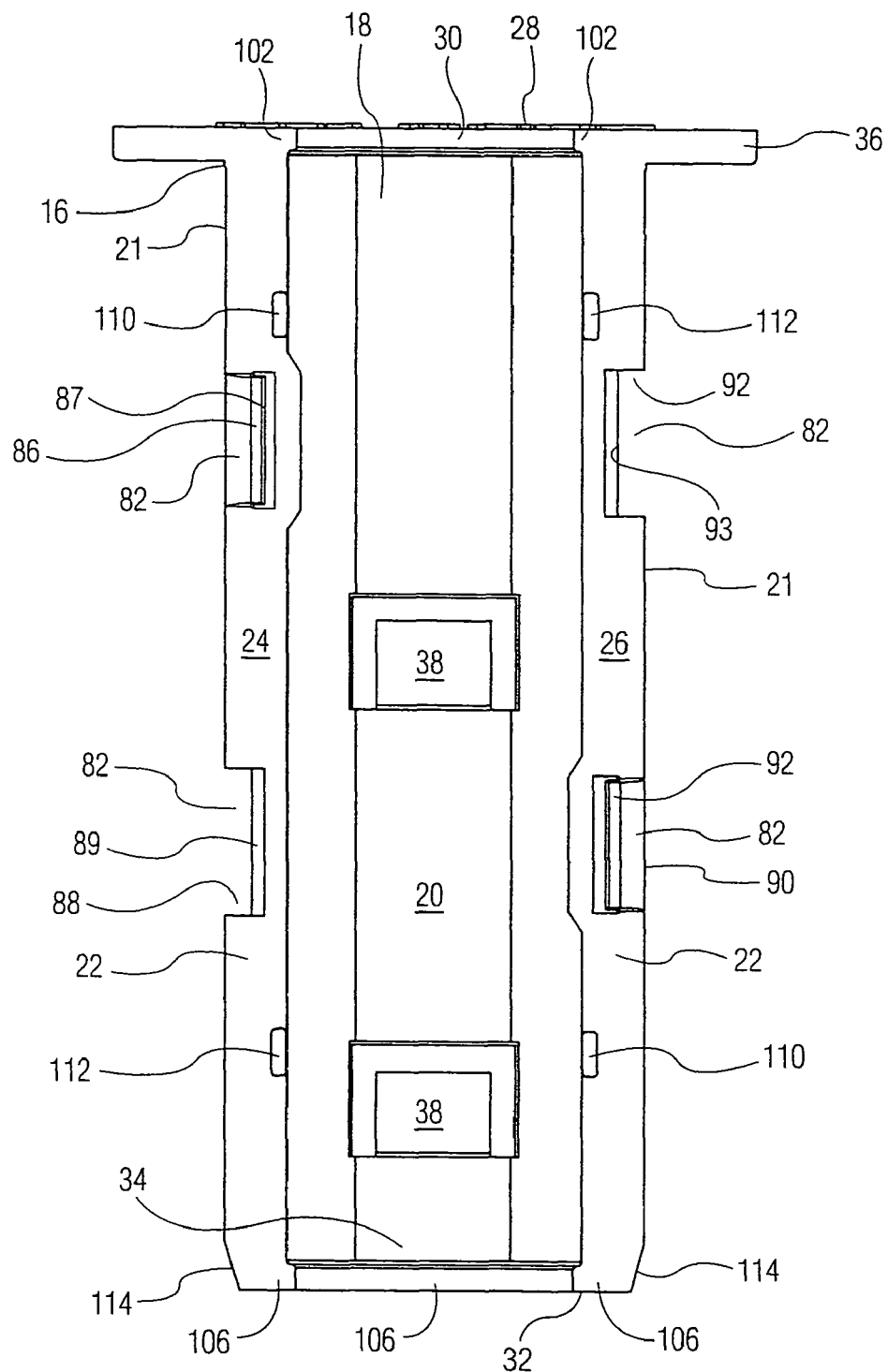
FIG. 2 is a front plan view of an embodiment of the first half section of the firestopping bushing of the present invention.

Each half section is configured preferably identically. In particular the first half section 16 includes a first half bore means 18 extending longitudinally therealong and a first interior surface 20 being generally concave and defining the first half bore means 18 therewithin. The first half section 16 will also define a first exterior surface 21 facing radially outwardly and spatially disposed from the first interior surface 20. Extending therebetween is a first abutment edge 22 including a first abutment edge first section also referenced herein as the primary first abutment edge section 24 and a first abutment edge second section also referenced herein as the secondary first abutment edge section 26 as shown best in FIG. 2. The first half section will include a first head end 28 which head end defines a first head opening means 30 therewithin. At the opposite end of the first half section 16 a first insertion end 32 is defined. First insertion end 32 defines a first insertion end opening means 34 therein. A first head flange section 36 is positioned at the first head end 28 of the first half section 16.

Figure 1:
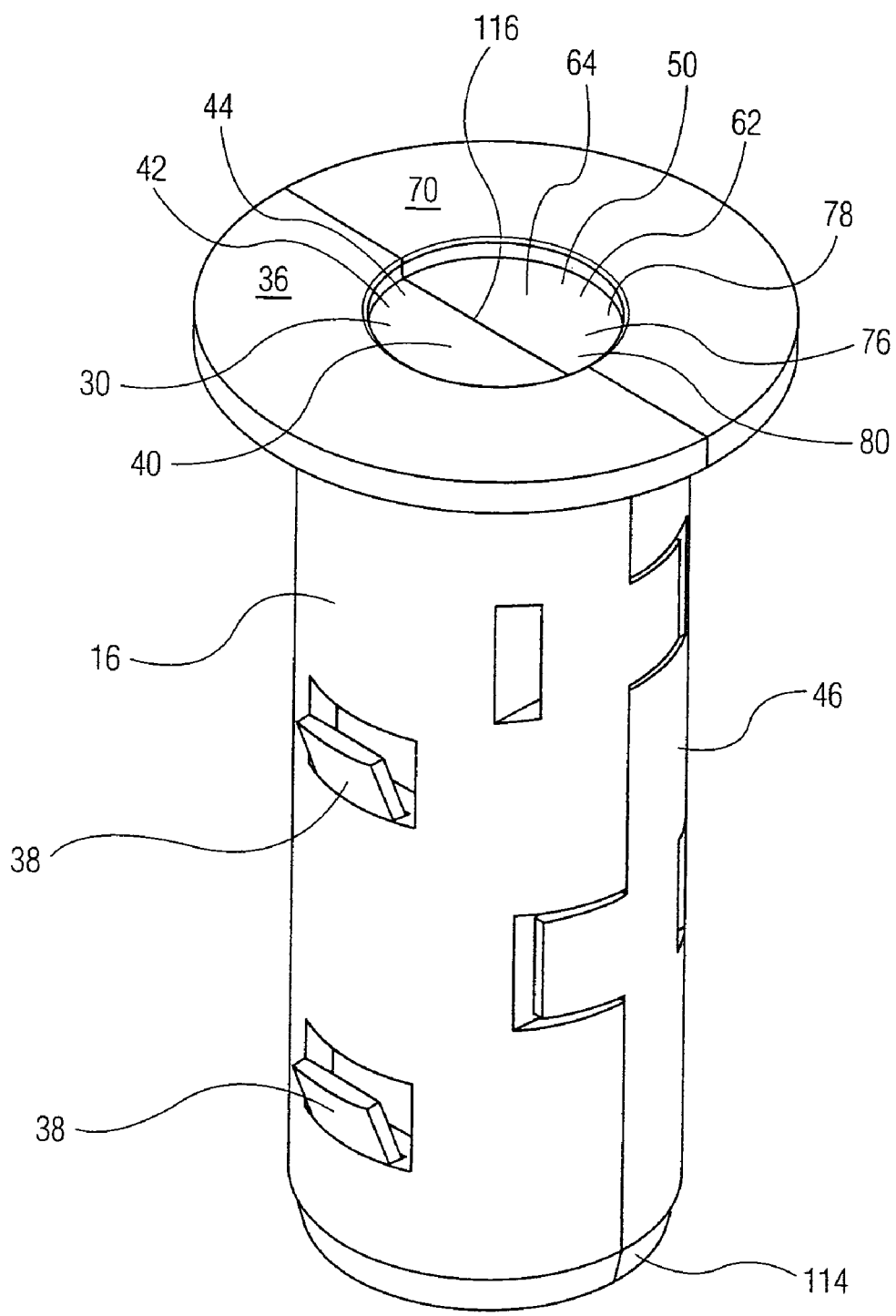
FIG. 1 is a perspective illustration of an embodiment of the firestopping bushing of the present invention.
Figure 4:
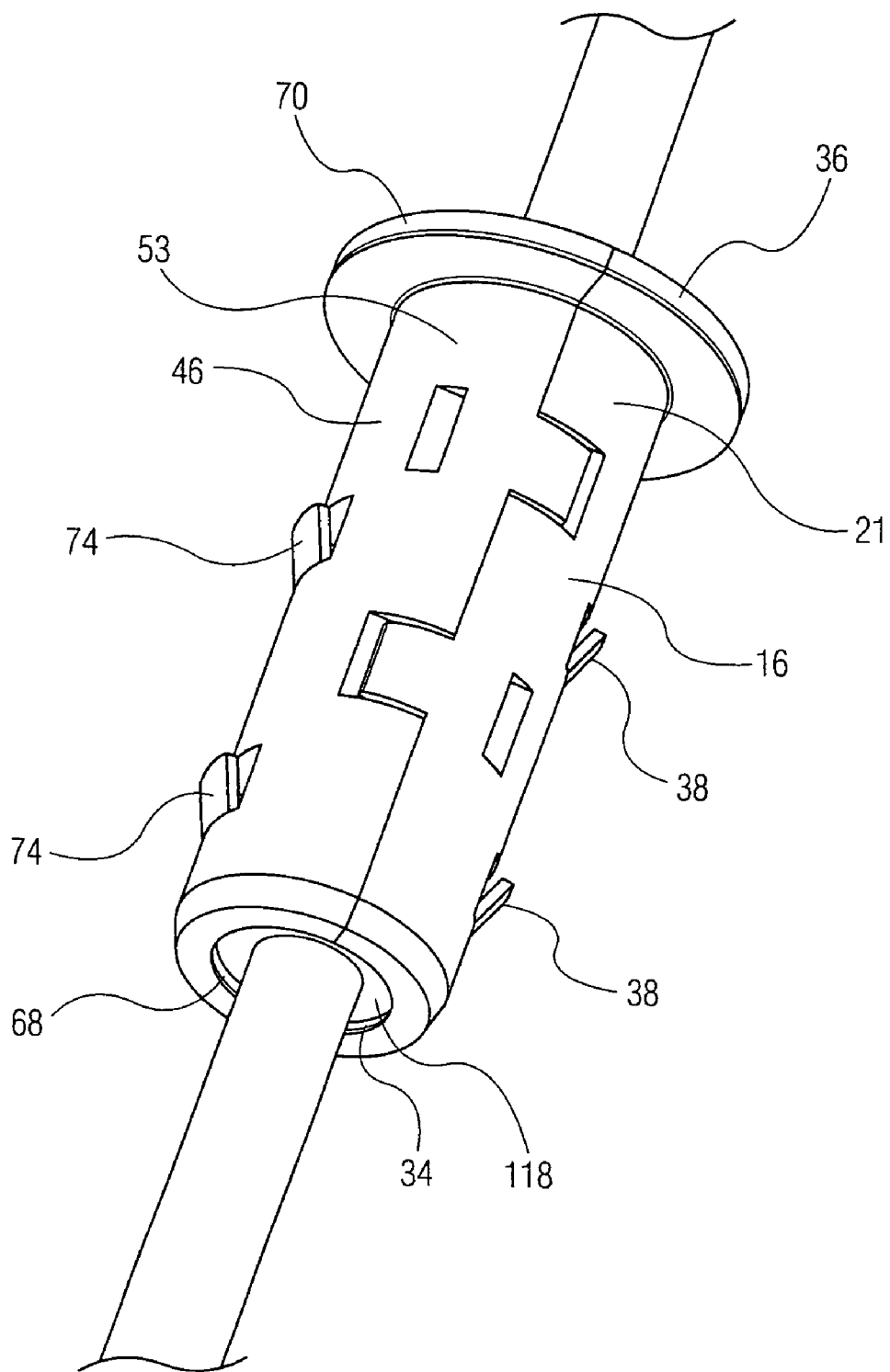
FIG. 4 is a side perspective view of the embodiment as shown in FIG. 1 showing the firestopping bushing in position after placement of the first half section and the second half section in mutual engagement surrounding a cable, wire or plug.
Figure 5:
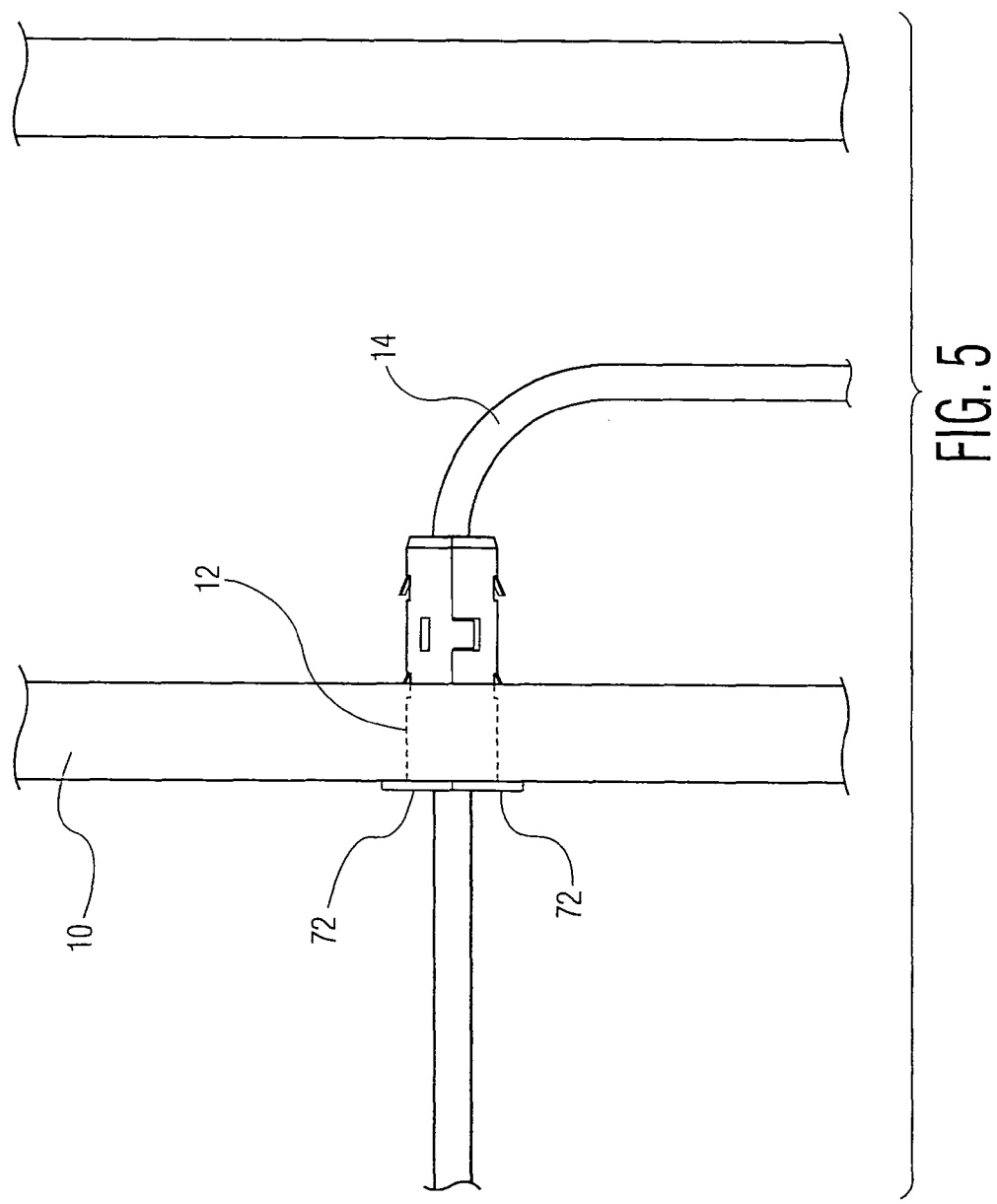
FIG. 5 is a side plan view of the embodiment of FIG. 4 shown positioned in engagement with respect to wallboard comprising a single thickness piece of gypsum wallboard of standard thickness with barbs engaging the rear wallboard surface.
Figure 6:
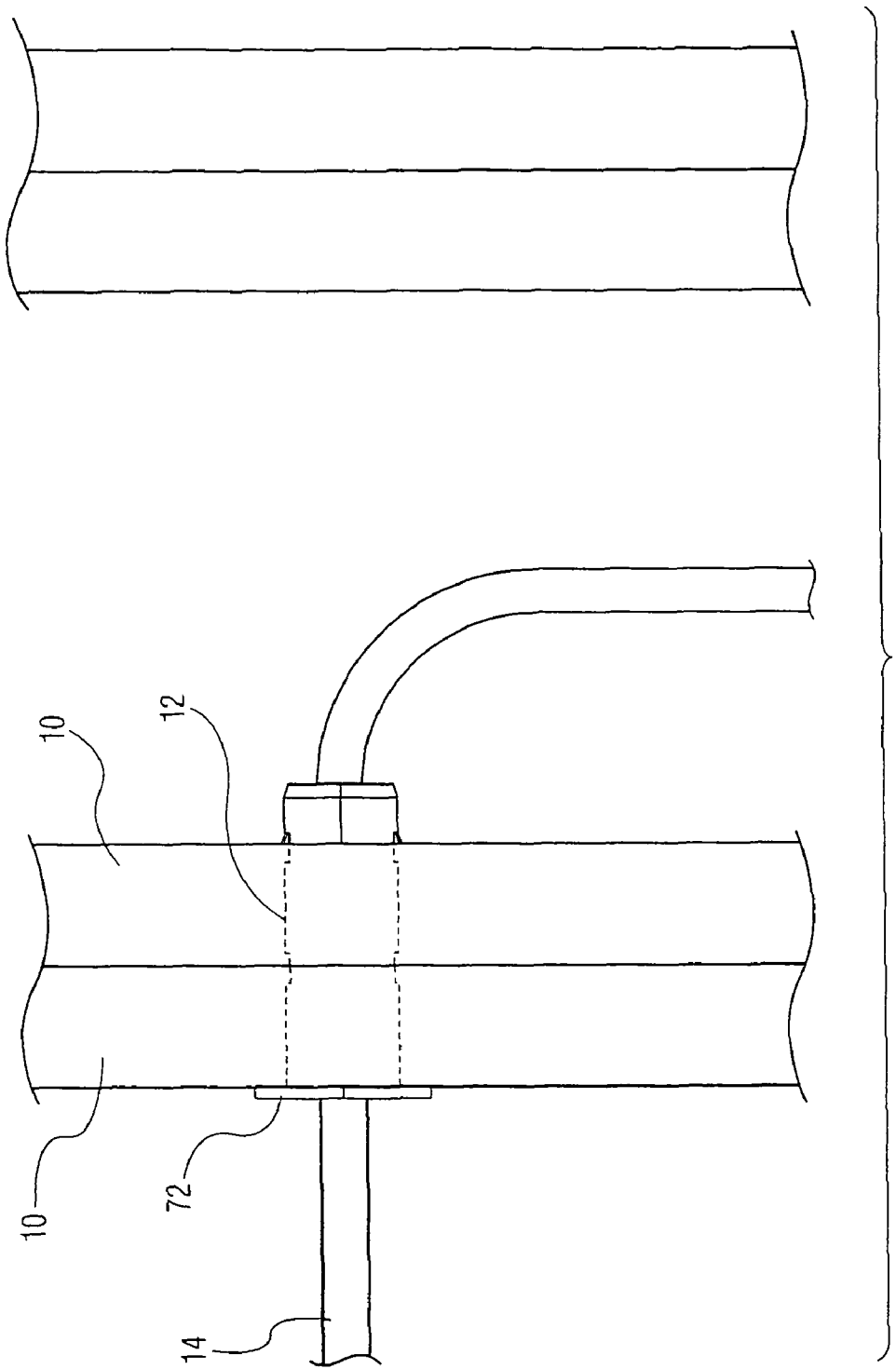
FIG. 6 is an illustration of the embodiment shown in FIG. 4 shown positioned extending through a wall formed of two separate abutting pieces of gypsum wallboard of standard thickness with barbs engaging the rear surface of the rearmost wallboard surface.
Figure 7:
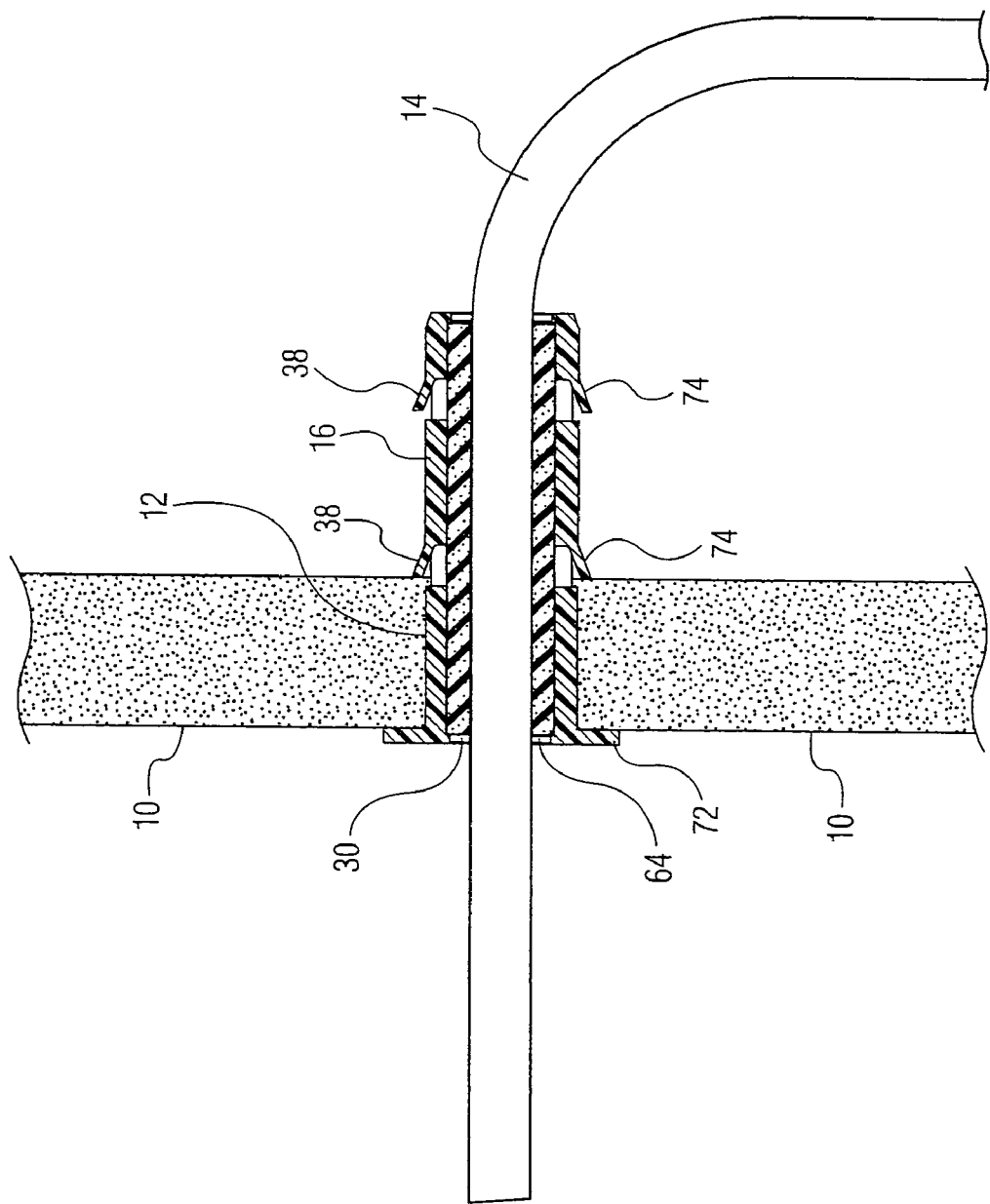
FIG. 7 is cross-sectional view of the embodiment shown in FIG. 5.
Figure 8:
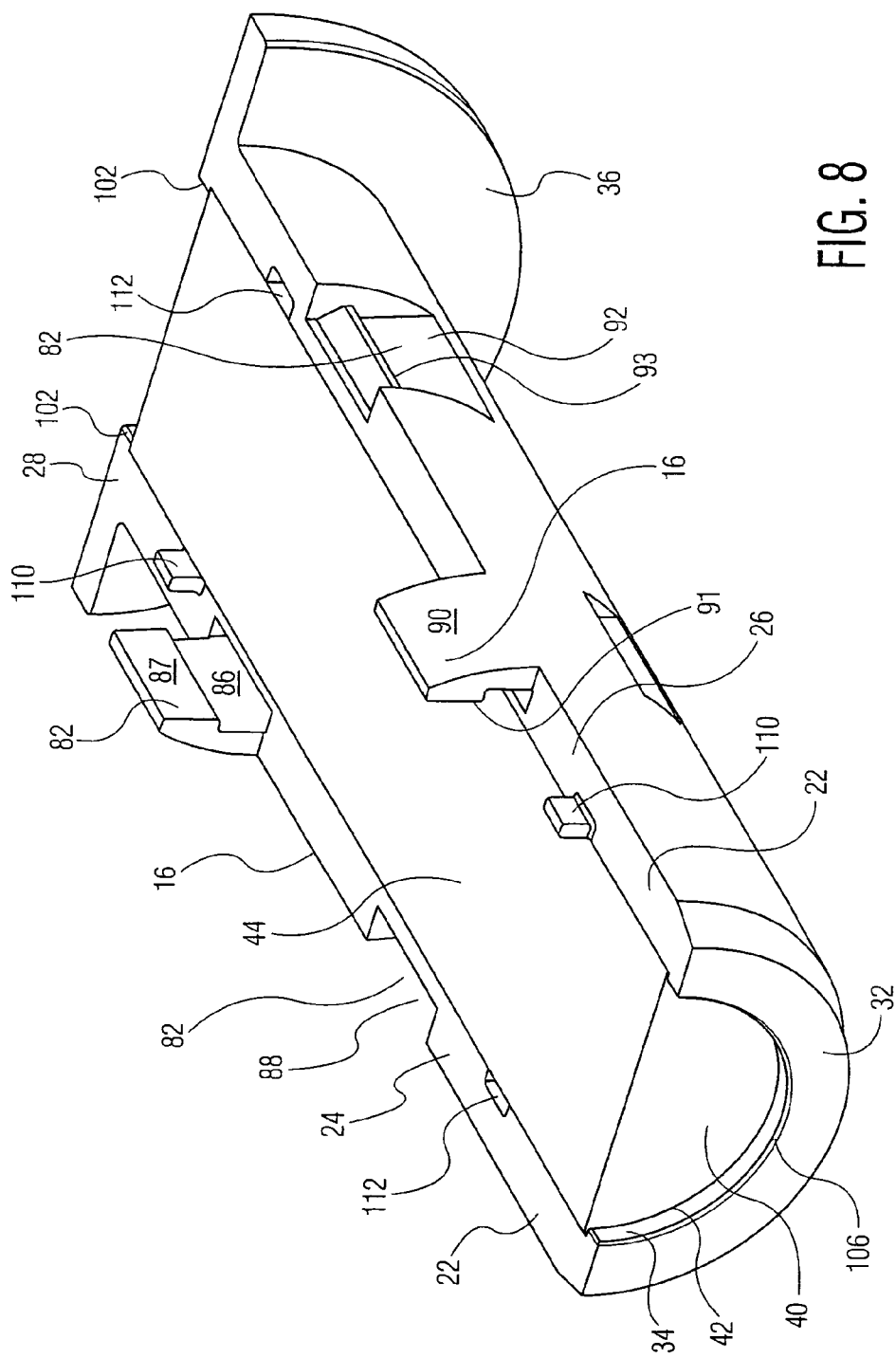
FIG. 8 is a perspective illustration of a first tubular half section with a first firestopping sealing section positioned within the first half bore thereof.
Figure 9:
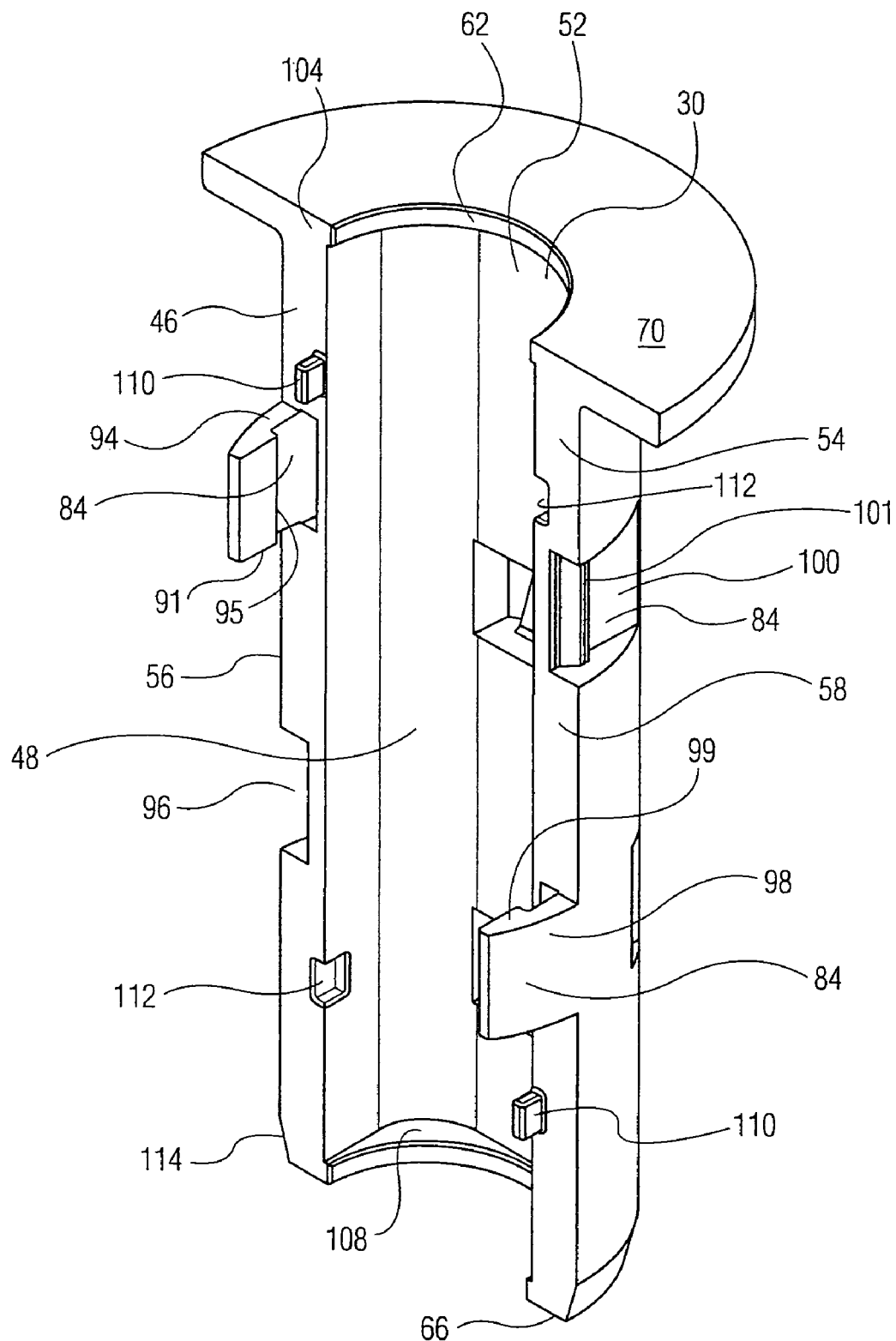
FIG. 9 is a perspective illustration of an embodiment of a second tubular half section of the firestopping bushing of the present invention.
Figure 10:
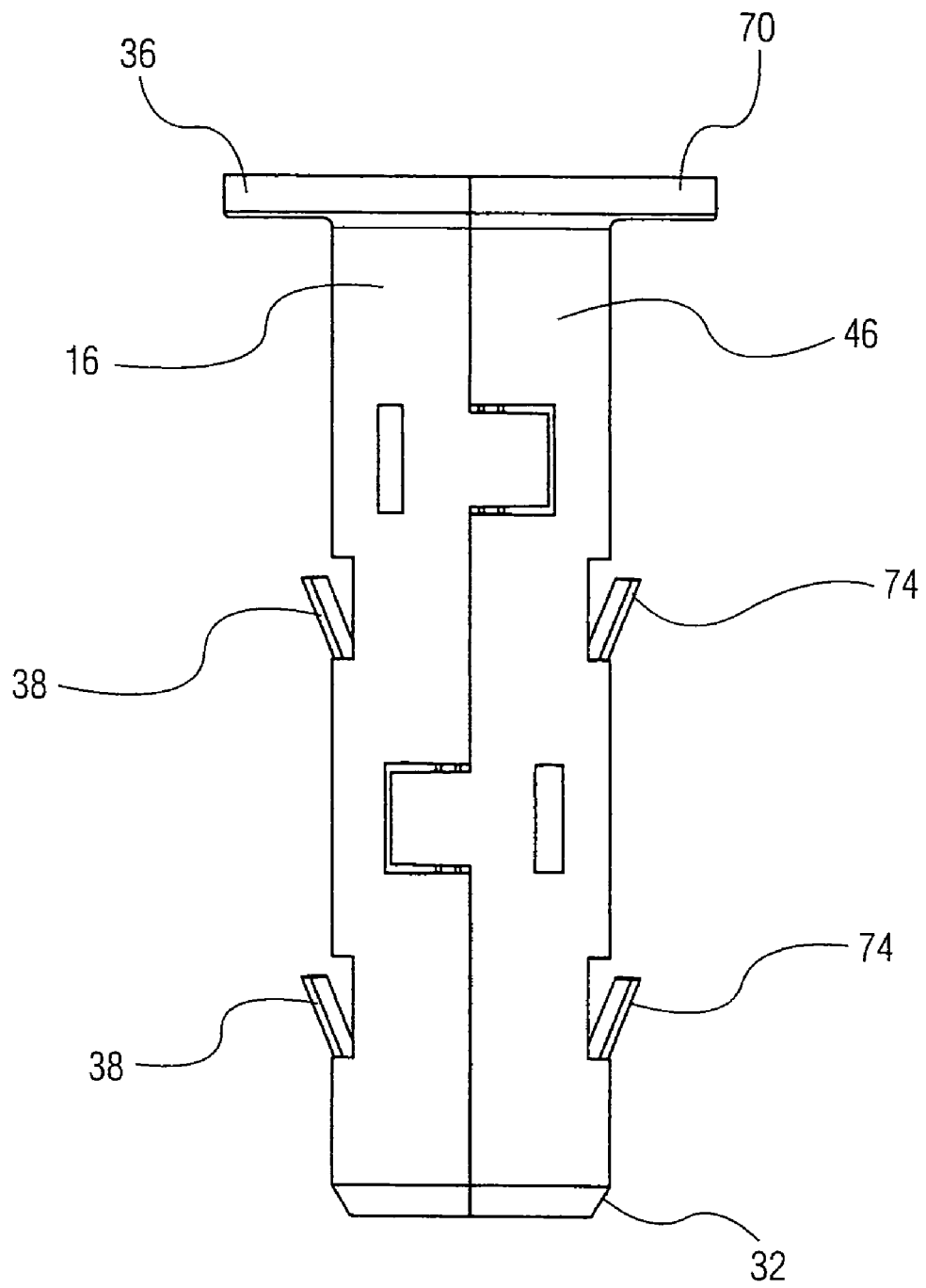
FIG. 10 is a side plan view of the firestopping bushing of the present invention showing the first half section and second half section in full abutting engagement.
Figure 11:
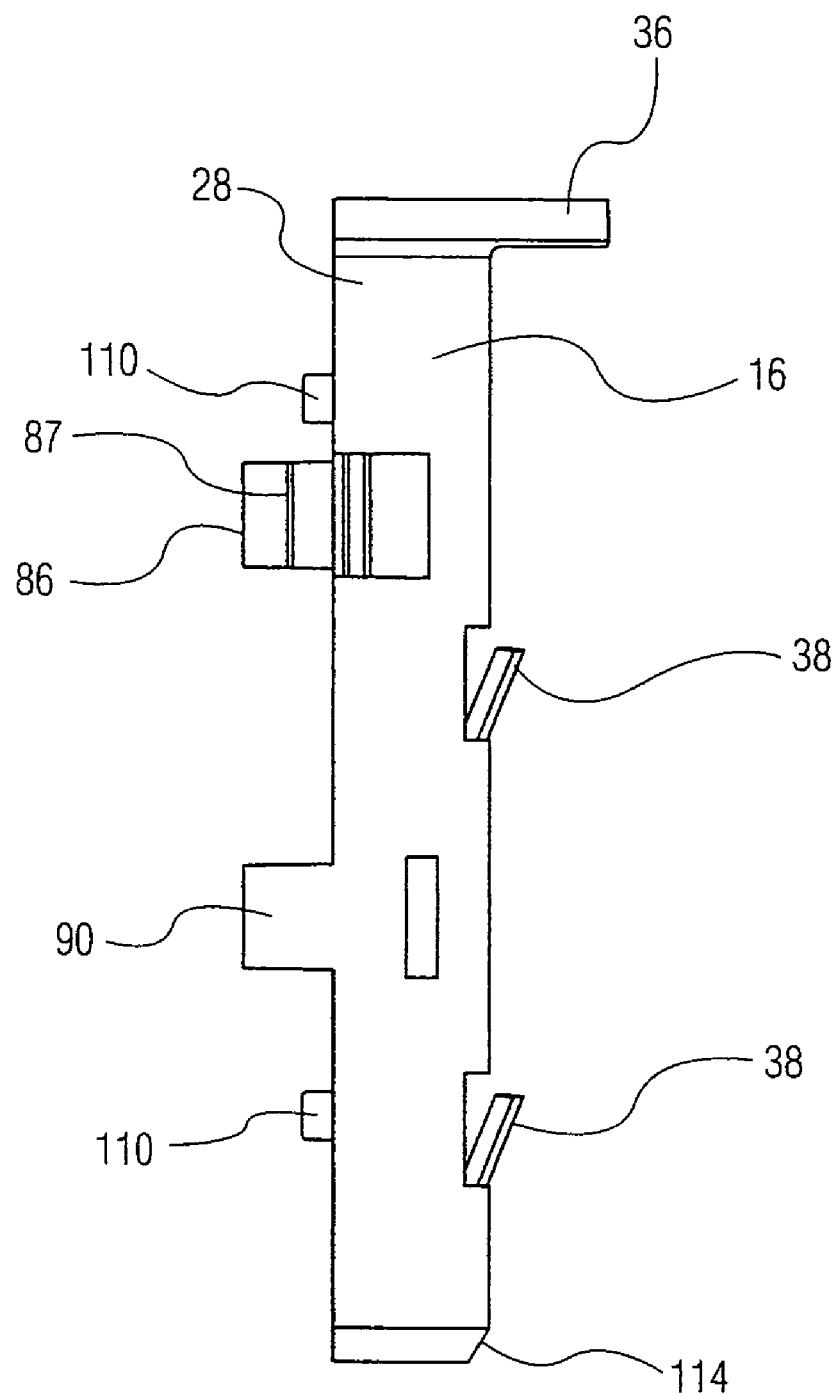
FIG. 11 is an side plan view of an embodiment of the first tubular half section of the split mechanical shell of the firestopping bushing of the present invention.

One or more first barbs 38 are positioned on the first exterior surface 21 as shown best in FIGS. 1 and 4 for the purpose of engaging the wallboard panel 10 and in particular engaging the rear surface thereof as shown best in FIGS. 5, 6 and 7. Preferably multiple first barbs 38 will be included such that use of the device of the present invention is possible with wallboard panels 10 of varying thicknesses. An example of such varying thicknesses is shown in FIGS. 5 and 6 which depict a single thickness and double thickness wallboard panel 10, respectively. A first firestopping sealing section 40 is defined positionable within the first half bore means 18 of first half section 16. This first firestopping sealing section 40 is preferably made of a firestopping material preferably in a foam format and preferably including an intumescent component to facilitate firestopping. The first firestopping sealing section 40 defines a first sealing section arcuate surface 42 adapted to abut the first interior surface 20 of the first half section 16 and in this manner be positioned within the first half bore means 18. A first sealing section planar surface 44 is also defined by the first firestopping sealing section 40 for the purpose of being positioned in abutting flexibly resilient engagement with respect to one or more penetrating members 14 extending through the first half bore means 18.

Figure 3:
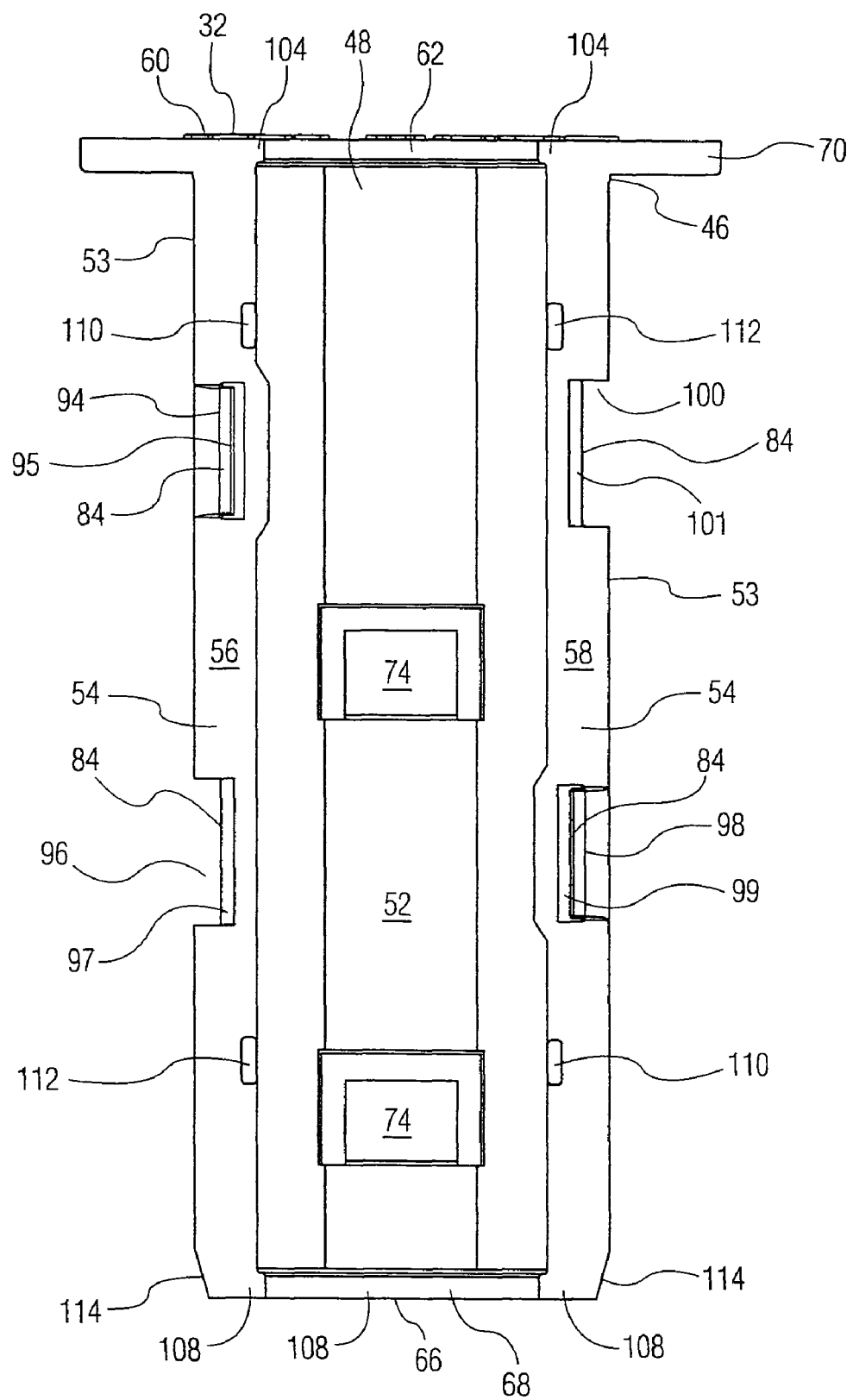
FIG. 3 is a front plan view of an embodiment of the second half section of the firestopping bushing of the present invention.

In a similar configuration as shown best in FIG. 3 a second half section 46 may define a second half bore means 48 extending longitudinally therealong. In the preferred configuration of this invention the first half section 16 and the second half section 46 are designed to be brought into abutting engagement with respect to one another by abutment of the first abutment edge 22 of first half section 16 and the second abutment edge 54 of the second half section 46. With second abutment edge 54 in abutment and engaged with respect to the first abutment edge 22 the first half bore means 18 and the second half bore means 48 will be positioned in abutment with respect to one another and will define a central bore means 50 extending along the bushing configuration in position between the first half section 16 and the second half section 46.

The second half section 46 will preferably include a second interior surface 52 which defines the second half bore means 48 extending therealong. The second half section 46 will also include a second exterior surface 53 facing radially outwardly from the second interior surface 52 and spatially disposed therefrom. The edges extending between the second exterior surface 53 and the second interior surface 52 will comprise the two sections of the second abutment edge 54. In this manner the second abutment edge 54 includes a second abutment edge first section also referenced herein as the primary second abutment edge section 56 and a second abutment edge second section also referenced herein as the secondary second abutment edge section 58, each of which will extend between the exterior surface 53 and the second interior surface 52 and be spatially disposed from one another as shown best in FIG. 3.

The second half section 46 will define a second head end 60 which defines a second head end opening 62 therewithin. When the first half section 16 and the second half section 46 are in abutment with respect to one another the first head opening means 30 and the second head opening means 62 will be positioned in abutment with respect to one another to define a main head opening means 64 therebetween.

The second half section 46 will also define a second insertion end 66 preferably at the opposite end from the second head end 60. This second insertion end 66 will define a second insertion end opening means 68. When the first half section 16 and the second half section 46 are engaged in abutment with respect to one another with the first abutment edge 22 in engaging abutment with respect to the second abutment edge 54 the second insertion end opening means 68 will be positioned adjacent to the first insertion end opening means 34 such as to mutually define the main insertion opening means 118. The main opening means 118 will preferably be in full fluid flow communication with respect to the central bore means 50 and with respect to the main head opening means 64. With this configuration the overall shape of the bushing of the present invention will be generally cylindrical with the outer cylindrical surface formed by the first exterior surface 21 and the second exterior surface 53. This cylindrical shape will define a central bore means 50 extending axially downwardly therethrough from a main head opening means 64 at the first head end 28 and the second head 60 and will continue to the first insertion end 32 and the second insertion end 66 to the main insertion opening means 118. In this manner the central bore 50 will extend completely through the bushing to define an area for retaining of the firestopping sealing sections.

The second half section 46 will also include a second flange section 70 at the head end thereof which will be positionable adjacent to the first head flange section 36 when the first half section 16 and the second half section 46 are joined to one another to define a head flange 72. This head flange 72 will extend outwardly from the first half section 16 and the second half section 46 to limit the depth of penetration of the bushing into the aperture 12 formed in the wallboard panel 10.

One or more second barbs 74 are positioned extending outwardly from the second exterior surface 53 of the second half section 46 to facilitate engagement with respect to the wallboard panel 10 when the second half section 46 is positioned within the aperture 12 defined in panel 10.

A second firestopping sealing section 76 is included in the construction of the bushing of the present invention. Second firestopping sealing section 76 includes a second sealing second arcuate surface 78 positionable in abutting engagement with respect to the second interior surface 52 of the second half section 46 to facilitate retaining of the second firestopping sealing section 76 within the second half bore 48 in direct abutment with the second interior surface 52. Second firestopping sealing section 76 also defines a second sealing section planar surface 80 oppositely positioned on the second firestopping sealing section 76 from the second sealing section arcuate surface 78 and adapted to engage penetrating members 14 extending through the central bore 50 of the bushing of the present invention.

In the preferred configuration of the present invention the second sealing section planar surface 80 will be in direct abutment with respect to the first sealing section planar surface 44 in such a manner as to define a sealing seam 116 therebetween. This seam is designed to receive the penetrating member or members 14 extending therethrough as they pass through the central bore 50 to facilitate firestop sealing therearound.

The first half section 16 of the present invention includes a first engaging means 82 and the second half section 46 includes a second engaging means 84. Engaging means 82 and 84 are adapted to engage one another to facilitate engagement of the first half section 16 and the second half section 46 with respect to one another with the first abutment edge 22 in engagement with respect to the second abutment edge 54. The preferable manner of engaging the first abutment edge 22 with respect to the second abutment edge 54 is engaging of the first abutment edge first section 24 with respect to the second abutment edge second section 58. Similarly the first abutment edge second section 26 is preferably designed to be attached with respect to the second abutment edge first section 56. This manner of engagement by choosing the appropriate configuration for both the first engaging means 82 and the second engaging means 84 allows the construction of the present invention to be made wherein the first half section 16 and the second half section 46 are of identical constructions. That is, they are made as the same part and only are at a later time defined as the first half section 16 and the second half section 46 and in this manner only one inventory identification need be made and only one mold need be made in order to form both the first half section 16 and the second half section 46.

With this construction the configuration of the engaging means includes a first latching pin 86 and a first latching slot 88 defined on the first abutment edge first section 24. In the configuration shown in FIG. 2 the first latching pin 86 will be closer to the first head end 28 of first half section 16 and the first latching slot 88 will be further distant therefrom spatially disposed away from the first latching pin 86. In this manner the first latching slot 88 will be closer to the first insertion end 32 thereof. To facilitate engagement the first latching pin 86 will include a first latching pin shoulder 87 and the first latching slot 88 will include therein a first latching slot shoulder 89. The first abutment edge first section 24 is designed to engage with respect to the second abutment edge second section 58. A fourth latching pin 98 and a fourth latching slot 100 are defined on the second abutment edge second section 58. The positioning of the fourth latching pin 98 and the fourth latching slot 100 is opposite from the relative positioning of the similarly shaped pin and slot defined on the first abutment edge first section 24 to facilitate engagement therebetween. That is, the fourth latching pin 98 will be closer to the second insertion end 66 whereas the fourth latching slot 100 will be closer to the second head end 60. In this manner when the first abutment edge first section 24 is positioned in abutment with respect to the second abutment edge second section 58 the first latching pin 86 will extend into the fourth latching slot 100 for engagement therewith. The fourth latching slot 100 will define a fourth latching slot shoulder 101 which is adapted to engage with respect to the first latching pin shoulder 87 of first latching pin 86 to facilitate engagement therewith.

Similarly when the first abutment edge first section 24 is in abutting engagement with respect to the second abutment edge second section 58 the fourth latching pin 98 will be positionable extending into the first latching slot 88 in such a manner as to be engageable therebetween. Fourth latching pin 98 will define a fourth latching pin shoulder 99 therewithin adapted to engage with respect to the first latching slot shoulder 89 in such a manner as to facilitate engagement between the first latching slot 88 and the fourth latching pin 98.

When the first half section 16 is positioned in abutment with second half section 46 to facilitate engagement therebetween the first abutment edge second section 26 will be in abutting alignment and engagement with respect to the second abutment edge first section 56. To facilitate detachable engagement therebetween a plurality of slots and pins are positioned on these two surfaces similar to the configuration described above in regard to the first abutment edge first section 24 and the second abutment edge second section 58.

For this purpose a second latching pin 90 will extend outwardly from the first abutment edge second section 26. Second latching pin 90 preferably includes a second latching pin shoulder 91 thereon to facilitate engagement with respect thereto. The first abutment edge second section 26 further defines a second latching slot 92 therein which includes a second latching slot shoulder 93 therewithin to facilitate engagement therewith. On the first abutment edge second section 26 the second latching slot 92 will be closer to the second head end 60 and the second latching pin 90 will be positioned closer to the second insertion end 66. The second latching pin 90 and the second latching slot 92 will be separated from one another with similar spacing as on each of the sections of the different firestopping sealing sections.

As shown in FIG. 3 the second abutment edge first section 56 will include a third latching pin 94 defined thereon with a third latching pin shoulder 95 defined by pin 94. The second abutment edge first section 56 will also include a third latching slot 96 therein with a third latching slot shoulder 97 defined therewithin.

When the first half section 16 and the second half section 46 are positioned in abutment with respect to one another the second latching pin 90 will be in registration and aligned with the third latching slot 46 such that the second latching pin shoulder 91 can engage with respect to the third latching slot shoulder 97 to facilitate engagement between second latching pin 90 and third latching slot 96. Simultaneously the third latching pin 94 will be in alignment with respect to the second latching slot 92 such that the third latching pin shoulder 95 can engage the second latching pin shoulder 93 for engaging third latching pin 94 within the second latching slot 92.

In this manner full engaging abutment will be achieved firstly between the first abutment edge first section 24 and the second abutment edge second section 58 as well as between the first abutment edge second section 26 and the second abutment edge first section 56. It should be appreciated that by reversing the position of the pin and the slot on the first and second sections of each half section, both the first half section 16 and the second half section 46, it is possible to use the same identical piece as the first half section and the second half section which provides obvious substantial savings in both inventory costs and mold costs.

Preferably the first half section 16 will include a first head retaining rim 102 adjacent the first head end 28 and a second head retaining rim 104 will be positioned adjacent the second head end 60 of second half section 46. The first head retaining rim 102 and the second head retaining rim 104 will both extend to a very small extent into the main head opening means 64 for the purpose of retaining the first firestopping sealing section 40 and the second firestopping sealing section 76 within the central bore means 50.

In a similar manner the first half bore means 18 will define a first insertion retaining rim 106 extending slightly into the first half bore means 18 thereof. Similarly the second half section 46 will define a second insertion retaining rim 108 extending slightly or to a very limited distance into the second half bore means 48. As such, the first insertion retaining rim 106 and the second insertion retaining rim 108 will both extend slightly into the main insertion opening means 118 which will further facilitate retaining of both the first firestopping sealing section 40 and the firestopping sealing section 76 within the central bore 50.

To facilitate maintaining alignment between the first abutment edge first section 24 and the second abutment edge second section 58 and between the first abutment edge second section 26 and the second abutment edge first section 56 a plurality of alignment pins 110 are included along with a plurality of alignment apertures 112 which are registrable with respect to one another and facilitate maintaining relative registration and alignment between the first half section 16 and the second half section 46 when in abutment with respect to one another.

Insertion of the bushing of the present invention is facilitated by the defining of a bevel 114 at the first insertion end 32 of the first half bore means 18 and at the second insertion end 66 of the second half section 46 which greatly facilitates ease of placement thereof within an aperture 12 defined in the wallboard 10.

As such, in use, two separate half sections are provided one of which is defined to be the first half section 16 and the other of which is defined to be the second half section 46. The penetrating wire or cable 14 is placed in abutment with the exposed first sealing section planar surface 44 of first half section 16 and the second sealing section planar surface 80 exposed on second half section 46. With the penetrating member 14 held flexibly resiliently in abutment with respect to these two planar sections, the first half section 16 is positioned in abutment for engagement with respect to the second half section 46 thereby capturing the penetrating member or members 14 therebetween within the sealing seam 116. This formed cylindrical bushing with the head flange 72 can then be pressed into the aperture 12 defined in the wallboard 10 until the bottom portion of the head flange 72 contacts the outer surface of the wallboard panel 10. In this manner the bushing is finally positioned in the wall and firestopping is achieved in a simple and convenient manner and use is made possible wherein a wire is already placed extending through the wall and firestopping can be achieved in an after market fashion in a quick and expedient manner with respect to wires already existing extending through walls and wallboard panels 10.

It is fairly common to position wire or cable plugs 15 within wallboard panels 10. The bushing of the present invention is very useful in firestopping around such a plug 15 while also affixing the plug in position extending through the wallboard 10 securely as shown in FIG. 12.

While particular embodiments of this invention have been shown in the drawings, described above and claimed herein, however it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A firestopping bushing positionable within an aperture defined in a wallboard panel for firestopping around one or more penetrating members extending therethrough comprising:
   A. a first half section being generally half tubularly shaped to define a first half bore means extending longitudinally therealong, said first half section including:
      (1) a first interior surface being generally arcuate and concave to define said first half bore means extending longitudinally therealong;
      (2) a first exterior surface being generally arcuate and convex positioned spatially disposed from said first interior surface and positioned facing radially outwardly therefrom;
      (3) a first abutment edge extending longitudinally along said first interior surface and said first exterior surface and being positioned extending therebetween, said first abutment edge including;
         a. a primary first abutment edge section extending longitudinally along said first interior surface and said first exterior surface and being positioned extending therebetween;
         b. a secondary first abutment edge section extending longitudinally along said first interior surface and said first exterior surface and being positioned extending therebetween at a position spatially disposed from said primary first abutment edge section with said first half bore means positioned therebetween;
      (4) a first head end defining a first head opening means therewithin in fluid flow communication with said first half bore means;
      (5) a first insertion end defining a first insertion opening means therein in fluid flow communication with respect to said first half bore means and with respect to said first head opening means;
      6) a first head flange section extending radially outwardly from said first exterior surface at said first head end thereof;
      (7) at least one first barb extending outwardly from said first exterior surface to facilitate engagement thereof with respect to the wallboard panel responsive to positioning of said first half section within the wallboard panel aperture;
   B. a first firestopping sealing section of flexible resilient firestopping material positionable within said first half bore means of said first half section which comprises:
      (1) a first sealing section arcuate surface positionable in abutment with respect to said first interior surface to facilitate retaining of said first firestopping seal section within said first half bore means;
      (2) a first sealing section planar surface oppositely positioned from said first sealing section arcuate surface and positionable in direct flexibly resilient abutment with penetrating members positioned extending through the fire stopping bushing to facilitate firestopping sealing therearound;
   C. a second half section being generally half tubularly shaped to define a second half bore means extending longitudinally therealong, said second half section and said first half section being attachable in abutment with respect to one another to position said first half bore means and said second half bore means adjacently together to define a central bore means extending axially and longitudinally through the firestopping bushing, said second half section including:
  (1) a second interior surface being generally arcuate and concave to define said second half bore means extending longitudinally therealong;
  (2) a second exterior surface being generally arcuate and convex positioned spatially disposed from said second interior surface and positioned facing radially outwardly therefrom;
  (3) a second abutment edge extending longitudinally along said second interior surface and said second exterior surface and being positioned extending therebetween, said second abutment edge including;
    a. a primary second abutment edge section extending longitudinally along said second interior surface and said second exterior surface and being positioned extending therebetween, said primary second abutment edge section of said second half section being positionable in abutment and engagement with said secondary first abutment edge section of said first half section to facilitate abutting engagement therebetween;
    b. a secondary second abutment edge section extending longitudinally along said second interior surface and said second exterior surface and being positioned extending therebetween at a position spatially disposed from said primary second abutment edge section with said second half bore means positioned therebetween, said secondary second abutment edge section of said second half section being positionable in abutment and engagement with said primary first abutment edge section of said first half section to facilitate abutting engagement therebetween;
  (4) a second head end defining a second head opening means therewithin in fluid flow communication with said second half bore means, said second head opening means and said first head opening means positioned adjacently to define together a main head opening means responsive to abutting engagement between said first half section and said second half section;
  (5) a second insertion end defining a second insertion opening means therein in fluid flow communication with respect to said second half bore means and with respect to said second head opening means, said second insertion opening means and said first insertion opening means positioned adjacently to define a main insertion opening means responsive to abutting engagement between said first half section and said second half section;
  (6) a second head flange section extending radially outwardly from said second exterior surface at said second head end, said second head flange section being positioned adjacent said first head flange section to define a head flange responsive to abutting engagement between said first half section and said second half section;
  (7) at least one second barb extending outwardly from said second exterior surface to facilitate engagement thereof with respect to the wallboard panel responsive to positioning of said second half section within the wallboard panel aperture;
  D. a second firestopping sealing section of flexible resilient firestopping material positionable within said second half bore means of said second half section which comprises:
    (1) a second sealing section arcuate surface positionable in abutment with respect to said second interior surface to facilitate retaining of said second firestopping sealing section within said second half bore means;
    (2) a second sealing section planar surface oppositely positioned from said second seal section arcuate surface and positionable in direct flexibly resilient abutment with said first seal section planar surface to define a sealing seam therebetween for receiving penetrating members positioned extending therethrough to facilitate firestopping sealing therearound.

2. A firestopping bushing positionable within an aperture defined in a wallboard panel for firestopping around one or more penetrating members extending therethrough as defined in claim 1 wherein said first firestopping sealing section and said second firestopping sealing section are made of a flexibly resilient foam firestopping material.

3. A firestopping bushing positionable within an aperture defined in a wallboard panel for firestopping around one or more penetrating members extending therethrough as defined in claim 1 wherein said first firestopping sealing section and said second firestopping sealing section are made of a flexibly resilient foam intumescent firestopping material.

4. A firestopping bushing positionable within an aperture defined in a wallboard panel for firestopping around one or more penetrating members extending therethrough as defined in claim 1 wherein said first half section and said second half section are configured identically with respect to one another.

5. A firestopping bushing positionable within an aperture defined in a wallboard panel for firestopping around one or more penetrating members extending therethrough as defined in claim 1 wherein said first half section includes a first engaging means positioned along said first abutment edge thereof and wherein said second half section includes a second engaging means positioned along said second abutment edge thereof, said first engaging means and said second engaging means being engagable with respect to one another to retain said first abutment edge of said first half section with respect to said second abutment edge of said second half section.

6. A firestopping bushing positionable within an aperture defined in a wallboard panel for firestopping around one or more penetrating members extending therethrough as defined in claim 1 wherein said first half section further includes:
  A. a first latching pin extending outwardly from said primary first abutment edge section;
  B. a first latching slot defined in said primary first abutment edge section spatially disposed from said first latching pin;
  C. a second latching pin extending outwardly from said first abutment edge second section; and
  D. a second latching slot defined in said secondary first abutment edge section spatially disposed from said first latching pin.

7. A firestopping bushing positionable within an aperture defined in a wallboard panel for firestopping around one or more penetrating members extending therethrough as defined in claim 6 wherein said second half section further includes:
  A. a third latching pin extending outwardly from said second abutment edge first section, said third latching pin being registrable and engagable with respect to said second latching slot to facilitate engagement of said first half section to said second half section;

B. a third latching slot defined in said primary second abutment edge section spatially disposed from said third latching pin, said second latching pin being registrable and engagable with respect to said third latching slot to facilitate engagement of said first half section to said second half section;

C. a fourth latching pin extending outwardly from said second abutment edge second section, said fourth latching pin being registrable and engagable with respect to said first latching slot to facilitate engagement of said first half section to said second half section; and D. a fourth latching slot defined in said secondary second abutment edge section spatially disposed from said third latching pin, said first latching pin being registrable and engagable with respect to said fourth latching slot to facilitate engagement of said first half section to said second half section.

8. A firestopping bushing positionable within an aperture defined in a wallboard panel for firestopping around one or more penetrating members extending therethrough as defined in claim 7 wherein said third latching pin is positioned closer to said second head end of said second half section than said third latching slot and wherein said fourth latching pin is positioned closer to said second insertion end of said second half section than said fourth latching slot to facilitate attachable engagement between said first half section and said second half section.

9. A firestopping bushing positionable within an aperture defined in a wallboard panel for firestopping around one or more penetrating members extending therethrough as defined in claim 7 wherein said first latching pin includes a first latching pin shoulder and wherein said fourth latching slot includes a fourth latching slot shoulder positioned therewithin to facilitate engagement of said first latching pin within said fourth latching slot, and wherein said second latching pin includes a second latching pin shoulder and wherein said third latching slot includes a third latching slot shoulder positioned therewithin to facilitate engagement of said second latching pin within said third latching slot, and wherein said third latching pin includes a third latching pin shoulder and wherein said second latching slot includes a second latching slot shoulder positioned therewithin to facilitate engagement of said third latching pin within said second latching slot, and wherein said fourth latching pin includes a fourth latching pin shoulder and wherein said first latching slot includes a first latching slot shoulder positioned therewithin to facilitate engagement of said fourth latching pin within said first latching slot.

10. A firestopping bushing positionable within an aperture defined in a wallboard panel for firestopping around one or more penetrating members extending therethrough as defined in claim 7 wherein said first latching pin is laterally flexible with respect to said first half section to facilitate engagement thereof with respect to said fourth latching slot, and wherein said second latching pin is laterally flexible with respect to said first half section to facilitate engagement thereof with respect to said third latching slot, and wherein said third latching pin is laterally flexible with respect to said second half section to facilitate engagement thereof with respect to said second latching slot, and wherein said fourth latching pin is laterally flexible with respect to said second half section to facilitate engagement thereof with respect to said first latching slot.

11. A firestopping bushing positionable within an aperture defined in a wallboard panel for firestopping around one or more penetrating members extending therethrough as defined in claim 6 wherein said first latching pin is positioned closer to said first head end of said first half section than said first latching slot and wherein said second latching pin is positioned closer to said first insertion end of said first half section than said second latching slot to facilitate attachable engagement between said first half section and said second half section.

12. A firestopping bushing positionable within an aperture defined in a wallboard panel for firestopping around one or more penetrating members extending therethrough as defined in claim 1 wherein said first abutment edge is oriented approximately perpendicularly with respect to said first interior surface and said first exterior surface and wherein said second abutment edge is oriented approximately perpendicularly with respect to said second interior surface and said first exterior surface.

13. A firestopping bushing positionable within an aperture defined in a wallboard panel for firestopping around one or more penetrating members extending therethrough as defined in claim 1 wherein said first half section and said second half section are both made from thermoplastic material.

14. A firestopping bushing positionable within an aperture defined in a wallboard panel for firestopping around one or more penetrating members extending therethrough as defined in claim 1 wherein said first half section includes at least two first barbs extending outwardly from said first exterior surface thereof with each said barb being spatially disposed from one another and positioned at different distances from said first head flange section to facilitate engagement thereof with respect to an aperture defined in wallboard panels of various thicknesses, and wherein said second half section includes at least two second barbs extending outwardly from said first exterior surface thereof with each said barb being spatially disposed from one another and positioned at different distances from said first head flange section to facilitate engagement thereof with respect to an aperture defined in wallboard panels of various thicknesses.

15. A firestopping bushing positionable within an aperture defined in a wallboard panel for firestopping around one or more penetrating members extending therethrough as defined in claim 1 further including a first head retaining rim extending inwardly from said first interior surface into said first head opening means to facilitate retaining of said first firestopping sealing section within said first half bore means, and further including a second head retaining rim extending inwardly from said second interior surface into said second head opening means to facilitate retaining of said second firestopping sealing section within said second half bore means.

16. A firestopping bushing positionable within an aperture defined in a wallboard panel for firestopping around one or more penetrating members extending therethrough as defined in claim 1 further including a first insertion retaining rim extending inwardly from said first interior surface into said first insertion opening means to facilitate retaining of said first firestopping sealing section within said first half bore means, and further including a second insertion retaining rim extending inwardly from said second interior surface into said second insertion opening means to facilitate retaining of said second firestopping sealing section within said second half bore means.

17. A firestopping bushing positionable within an aperture defined in a wallboard panel for firestopping around one or more penetrating members extending therethrough comprising:

A. a first half section being generally half tubularly shaped to define a first half bore means extending longitudinally therealong, said first half section including:

(1) a first exterior surface being generally arcuate and convex;
(2) a first abutment edge extending longitudinally along said first exterior surface;
(3) a first head end defining a first head opening means therewithin in fluid flow communication with said first half bore means;
(4) a first insertion end defining a first insertion opening means therein in fluid flow communication with respect to said first half bore means and with respect to said first head opening means;
(5) a first head flange section extending radially outwardly from said first exterior surface at said first head end thereof, said first head flange being adapted to limit the depth of penetration of said first half section into the wallboard aperture;
(6) at least one first barb extending outwardly from said first exterior surface to facilitate engagement thereof with respect to the wallboard panel responsive to positioning of said first half section within the wallboard panel aperture;
(7) a first engaging means positioned along said first abutment edge thereof for facilitating engagement therewith;

B. a first firestopping sealing section of flexible resilient firestopping material positionable within said first half bore means of said first half section;

C. a second half section being generally half tubularly shaped to define a second half bore means extending longitudinally therealong, said second half section and said first half section being attachable in abutment with respect to one another to position said first half bore means and said second half bore means adjacently together to define a central bore means extending axially and longitudinally through the firestopping bushing, said second half section including:
(1) a second exterior surface being generally arcuate and convex;
(2) a second abutment edge extending longitudinally along said second exterior surface;
(3) a second head end defining a second head opening means therewithin in fluid flow communication with said second half bore means, said second head opening means and said first head opening means positioned adjacently to define together a main head opening means responsive to abutting engagement between said first half section and said second half section with said first abutment edge and said second abutment edge in mutual abutting engagement;
(4) a second insertion end defining a second insertion opening means therein in fluid flow communication with respect to said second half bore means and with respect to said second head opening means, said second insertion opening means and said first insertion opening means positioned adjacently to define a main insertion opening means responsive to abutting engagement between said first half section and said second half section;
(5) a second head flange section extending radially outwardly from said second exterior surface at said second head end thereof, said second head flange section being positioned adjacent said first head flange section to define a head flange responsive to abutting engagement between said first half section and said second half section, said second head flange being adapted to limit the depth of penetration of said second half section into the wallboard aperture;
(6) at least one second barb extending outwardly from said second exterior surface to facilitate engagement thereof with respect to the wallboard panel responsive to positioning of said second half section within the wallboard panel aperture;
(7) a second engaging means positioned along said second abutment edge, said first engaging means and said second engaging means being engagable with respect to one another to retain said first abutment edge of said first half section with respect to said second abutment edge of said second half section; and D. a second firestopping sealing section of flexible resilient firestopping material positionable within said second half bore means of said second half section and positionable in direct flexibly resilient abutment with said first firestopping sealing section responsive to attachment of said first half section to said second half section to define a sealing seam therebetween within said central bore means for receiving penetrating members positioned extending therethrough to facilitate firestopping sealing therearound.

18. A firestopping bushing positionable within an aperture defined in a wallboard panel for firestopping around one or more penetrating members extending therethrough as defined in claim 17 wherein said first firestopping sealing section and said second firestopping sealing section are made of a flexibly resilient foam firestopping material.

19. A firestopping bushing positionable within an aperture defined in a wallboard panel for firestopping around one or more penetrating members extending therethrough as defined in claim 18 wherein said first firestopping sealing section and said second firestopping sealing section are made of a flexibly resilient foam intumescent firestopping material.

20. A firestopping bushing positionable within an aperture defined in a wallboard panel for firestopping around one or more penetrating members extending therethrough as defined in claim 18 wherein said first half section and said second half section are configured identically with respect to one another.

21. A firestopping bushing positionable within an aperture defined in a wallboard panel for firestopping around one or more penetrating members extending therethrough as defined in claim 18 wherein said first half section and said second half section each include at least one alignment pin and each define at least one alignment aperture being mutually registrable wherein each of said alignment pins extends into one of said alignment apertures responsive to engaging abutment of said first abutment edge and said second abutment edge for maintaining aligned relative positioning of said first half section and said second half section.

* * * * *